United States Patent [19]
Fitch

[11] 3,839,910
[45] Oct. 8, 1974

[54] PROCESS FOR MONITORING ABNORMAL GAS FLOW RATES IN A STACK HAVING AN ESTABLISHED FLOW RATE

[75] Inventor: Arthur Haines Fitch, Mountain Lakes, N.J.

[73] Assignee: Bell Telephone Laboratories Incorporated, Murray Hill, N.J.

[22] Filed: Dec. 12, 1972

[21] Appl. No.: 314,332

Related U.S. Application Data

[63] Continuation of Ser. No. 130,403, April 1, 1971, abandoned.

[52] U.S. Cl............................................. 73/194 F
[51] Int. Cl........................ G01f 1/00, G01h 27/62
[58] Field of Search........... 73/194 F; 250/356, 382, 250/383, 384

[56] References Cited
UNITED STATES PATENTS

| | | | |
|---|---|---|---|
| 1,808,709 | 6/1931 | Blake | 73/194 |
| 2,569,974 | 10/1951 | Campbell | 73/194 |
| 3,449,667 | 6/1969 | Gourdine | 73/194 |
| 3,478,261 | 11/1969 | Forster et al. | 73/194 |
| 3,679,973 | 7/1972 | Smith | 73/194 |
| 3,688,106 | 8/1972 | Brian | 73/194 |

*Primary Examiner*—Herbert Goldstein
*Attorney, Agent, or Firm*—C. E. Graves

[57] ABSTRACT

Gas flow rates in industrial stacks are monitored based on the response at the top of the stack to ionization of gases effected at the bottom of the stack. The Transit time between two two spaced ion detector probes is determined from a knowledge of the ion recombination rate and the values of the saturation currents monitored at the probes.

4 Claims, 4 Drawing Figures

PROCESS FOR MONITORING ABNORMAL GAS FLOW RATES IN A STACK HAVING AN ESTABLISHED FLOW RATE

This application is a continuation of application Ser. No. 130,403, filed Apr. 1, 1971, now abandoned

FIELD OF THE INVENTION

This invention relates to air pollution control in general; and specifically to a method for monitoring the gas flow rates within industrial stacks so as to calculate the total pollutant discharge.

BACKGROUND OF THE INVENTION

Control of stack gas pollutants requires measurement of their concentration per unit volume of discharge, and measurement of gas flow rates within the stack. With increasingly widespread concern over industrial stack efflux, the need has grown for inexpensive and accurate flow rate monitoring equipment.

Many flow rate systems rely on gas samples taken at the stack discharge point. These systems, however, are prone to various errors stemming from prevailing wind conditions, rain, etc. On the other hand, in-stack monitoring equipment heretofore proposed has been objectionable on grounds of installation costs alone.

Accordingly, the following are objects of the invention:

broadly, to better measure the full impact of gaseous pollutants emanating from stacks;

specifically, to measure the gas flow rate within stacks accurately and inexpensively; and more specifically, to measure stack gas flow rates at a minimum of cost, using no moving parts, and without significant alteration to existing stacks.

SUMMARY OF THE INVENTION

Pursuant to this invention, stack flow rates are monitored by ionizing of gas at or near the stack bottom, and calculating the electrical response to such ionization at some point a predetermined distance above the ionization zone.

The ionization is achieved by any of a number of methods such as, for example, a set of high voltage corona needles, or a radioactive source. In some cases, the gases at the stack base may intrinsically have a sufficiently high and constant ionization level and thus would require no induced ionization.

From its initial level at the stack base, ion concentration decreases as a function of time and the recombination coefficient of the gas or gases present. Initial levels are readily attainable that have a "half life" in the range of a few seconds, which is comparable to typical gas transit time in stacks.

Hence, in one inventive embodiment, a pulse of ionization voltage is applied through electrodes placed into the gas flow at the stack base, producing gas ions. Ion detector probes are placed into the flow path within the stack at one or more positions. The elapsed time between the ion-generating pulse and detection of the ions at any of the probe positions, is measured. Since the distances between the electrodes and each of the probe sets are known, the velocity of the ionized gas—and hence, the stack gas—is determined.

In a further inventive embodiment, the transit time of ionized gas between the probes is monitored by knowing the ion recombination rate, and using the fact that saturation current applied to two spaced ion detector probes is proportional to ion concentration. In this embodiment, saturation current at the two probes is monitored continuously; and advantageously a continuous ion source is employed.

The invention and its further objects, advantages, and features will be readily appreciated in full from the description to follow of an illustrative embodiment.

DETAILED DESCRIPTION OF AN ILLUSTRATIVE EMBODIMENT

Figure 1:
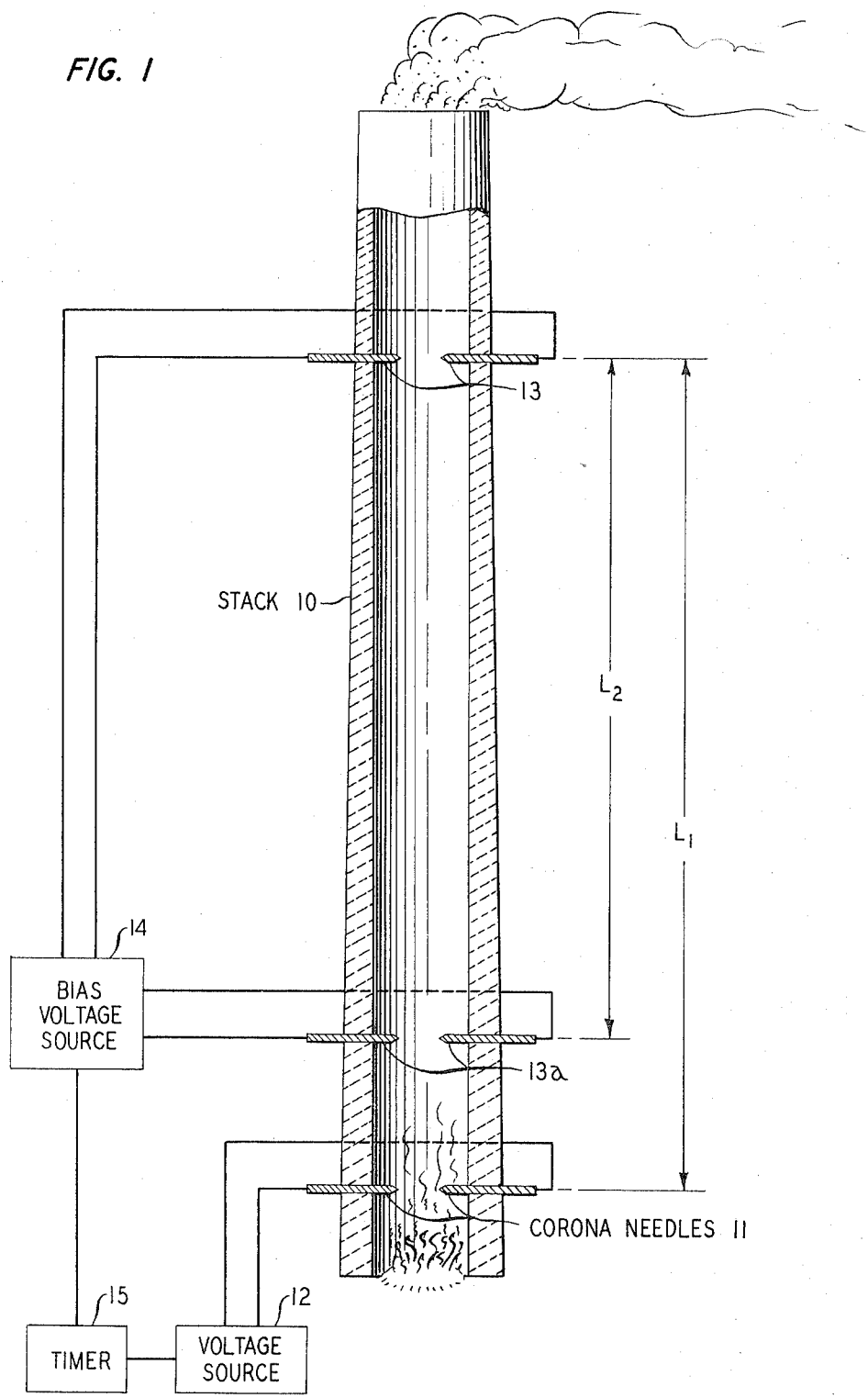
FIG. 1 is a side schematic view of a stack adapted with the present invention.

The stack, designated 10 in FIG. 1 includes a base 11 into which the hot discharging gases pass. In a first embodiment ionization in these gases is achieved by the high voltage corona needles connected to a voltage source 12. Needles 11 may, for example, be energized by a short burst of voltage, producing a thin layer or region of ionized gas which then rises at the same rate as the mass of hot gases.

A set of ion detector probes 13 located well up in the stack, are connected to a biasing voltage source 14. As the ionized gas layer passes probes 13, a current pulse will occur in the probe circuit. The time elapsed between application of the ionization pulse by needles 11 and detection of the current pulse in the probe circuit is measured, as, for example, by timer 15. The velocity of the stack gases then is calculated by dividing the known distance $L_1$ between the needles 11 and probes 13, by the elapsed time.

Devices known as precipitators have been used for the purpose of cleansing exhausts from stacks. As precipitators have the electrical apparatus capable of producing ionization in a stack, suitable alteration of these devices to permit identifiable ion pulses and appropriate location of collection probes could allow their use in measuring stack gas velocities.

In a second embodiment, two sets of ion detector needles are used; an upper set 13 and a lower set 13a separated by a known distance $L_2$. Operation is the same as described for the first embodiment, except that time is measured from impingement of the rising ionized layer upon probes 13a, to impingement upon probes 13. Velocity is calculated using this elapsed time and the distance $L_2$.

Whether one or two probe sets are used, it is desirable that along the stack length defined by $L_1$ or $L_2$, the stack diameter be relatively constant.

Both of the embodiments described depend on measuring the time of rise of an ionized region as determined by detecting passage of, for example, a thin ionized layer between two points of known separation. A third embodiment is set forth below with the aid of the explanation to follow, in conjunction with the material of FIGS. 2–4.

If $dn$ represents the increase in ion concentration in time $dt$ after an ionizing agent has ceased to act, then:

$$dn = \alpha n^2\, dt$$

where $\alpha$ is a previously determined coefficient of recombination.

Hence, $$\int_{n_0}^{n} \frac{dn}{n^2} = -\int_0^t \alpha \, dt \qquad (2)$$

where $n_0$ represents the ion concentration at a certain instant, and $n$ represents the ion concentration still remaining $t$ seconds later.

Integrating both sides and evaluating the integrated functions: $1/n - 1/n_0 = \alpha t$    (3)

Equation (3) can be written $$n = n_0 / 1 + n_0 \, \alpha t \qquad (4)$$

For initial ion concentrations of about $10^5/cm^3$, the time required for half of the ions of most stack gases to recombine is of the order of a few seconds, which is comparable with typical stack gas transit times.

In this embodiment, advantageously, ionization is caused to take place over a time at least in excess of the transit time. Alternatively, the intrinsic ionization of the rising gases, if of high enough concentration, may be turned to account.

Figure 2:
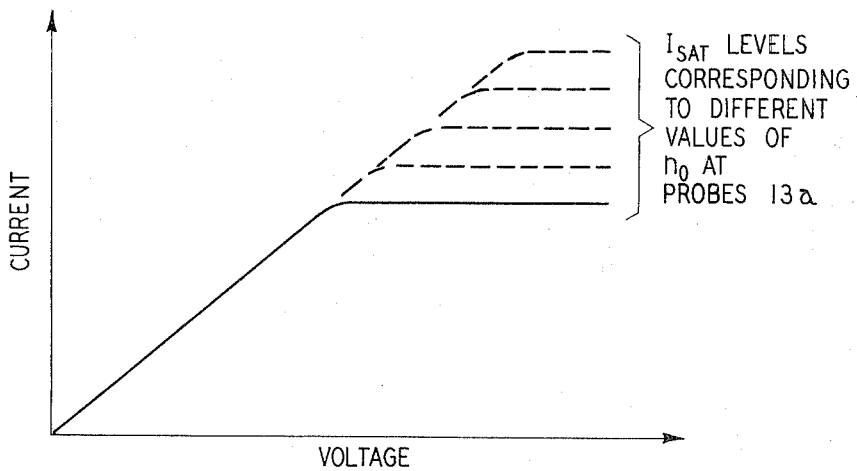
FIGS. 2–4 are graphs depicting various electrical characteristics of the invention.
Figure 3:
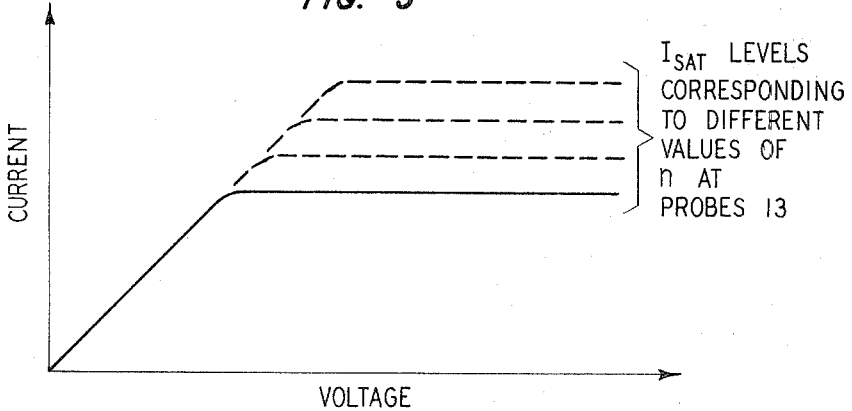
Figure 4:
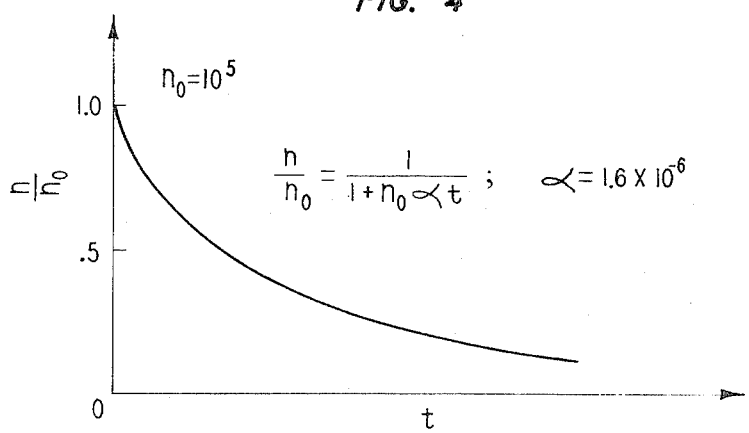

Pursuant to this inventive embodiment, sufficient biasing voltage from source 14 is applied to detector probes 13 and 13a to bring each to the point of saturation current, as depicted in FIGS. 2 and 3. The saturation currents for probes 13 and 13a are proportional to the ion concentrations impinging upon each at any given moment, i.e., $$I = kn \qquad (5)$$

$$I_o = kn_o \qquad (6)$$

By substitution of Equations (5), (6) into Equation (3):

$$1/I - 1/I_o = \alpha' \, t \qquad (7)$$

where $$\alpha' = \alpha/k \qquad (8)$$

If the drift or transit time $t$ is known, as by using the method of the first embodiment, then $\alpha'$ can be determined by simultaneously measuring the saturation currents $I$ and $I_o$. It follows that, given reasonably constant conditions, the drift time $t$ and therefore the drift velocity can be monitored by a measurement of the two saturation currents $I$ and $I_o$. As a calibration check, the pulse injection method described in the first embodiment can be performed periodically.

It should be noted that in Equation (7), as $t$ increases, the term ($1/I$) dominates the equation. This means that a single set of detection probes placed sufficiently far from the ion source would suffice to monitor the stack gas velocity—again, given reasonably constant conditions.

It is to be understood that the embodiments described herein are merely illustrative of the principles of the invention. Various modifications may be made thereto by persons skilled in the art without departing from the spirit and scope of the invention.

What is claimed is:

1. Process for monitoring abnormal gas flow rate within an effluent-discharging stack having an established normal gas flow rate, comprising:
   ionizing the rising stack gas at a first fixed point within the stack lower recesses to an initial concentration sufficiently great to produce a detectable gas ion presence at a lower and an upper point widely separated and above said first fixed point,
   disposing first and second detector probe pairs respectively at said lower and upper points,
   predetermining the normal transit time of said gas between said probe pairs based on said established gas flow rate,
   applying biasing voltage to each of said probe pairs to maintain saturation currents $I$ and $I_o$ flowing respectively between the probes of the respective said lower and upper probe pairs,
   simultaneously measuring said saturation currents $I$ and $I_o$, said currents being at all times proportional to the ion concentration levels presently existing at the respective probe pairs,
   whereby from said measured currents $I$ and $I_o$ the present gas transit time can be monitored and compared to said normal gas transit time as an indication of departure from said established gas flow rate.

2. Process pursuant to claim 1, including the further step of: converting said measured currents $I$ and $I_o$ to an indicia of present gas transit time between said lower and upper probe pairs.

3. Process pursuant to claim 2, wherein said ionizing step creates an initial ion concentration of at least $10^5/cm^3$.

4. Process pursuant to claim 2, wherein said converting step consists of: determining said present gas transit time between said lower and upper probe pairs, from (a) said measured currents $I$ and $I_o$, (b) a known coefficient of recombination unique to the composition of said stack gas, and (c) a known constant of proportionality $k$ between said ion concentration and said respective saturation currents $I$ and $I_o$.

* * * * *